United States Patent
Hodrus

(10) Patent No.: US 9,803,703 B2
(45) Date of Patent: Oct. 31, 2017

(54) METHOD FOR ADJUSTING A CO-EFFICIENT OF FRICTION OF A DISCONNECT CLUTCH OF A HYBRID VEHICLE

(71) Applicant: Schaeffler Technologies AG & Co. KG, Herzogenaurach (DE)

(72) Inventor: Erhard Hodrus, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 103 days.

(21) Appl. No.: 14/838,838

(22) Filed: Aug. 28, 2015

(65) Prior Publication Data
US 2016/0075321 A1 Mar. 17, 2016

(30) Foreign Application Priority Data

Sep. 15, 2014 (DE) .......... 10 2014 218 465
Nov. 28, 2014 (DE) .......... 10 2014 224 351

(51) Int. Cl.
*F16D 48/06* (2006.01)
*F16D 48/08* (2006.01)

(52) U.S. Cl.
CPC ............ *F16D 48/06* (2013.01); *F16D 48/08* (2013.01); *F16D 2500/1026* (2013.01); *F16D 2500/1045* (2013.01); *F16D 2500/1066* (2013.01); *F16D 2500/1083* (2013.01); *F16D 2500/1085* (2013.01); *F16D 2500/10412* (2013.01); *F16D 2500/3026* (2013.01); *F16D 2500/30402* (2013.01); *F16D 2500/50236* (2013.01); *F16D 2500/50281* (2013.01); *F16D 2500/50858* (2013.01); *F16D 2500/7041* (2013.01);
(Continued)

(58) Field of Classification Search
CPC .. F16D 48/06; F16D 48/08; F16D 2500/1066; F16D 2500/50236; F16D 2500/1085; F16D 2500/50858; F16D 2500/3026; F16D 2500/70426; F16D 2500/1026; F16D 2500/1083; F16D 2500/7041; Y02T 10/6221
See application file for complete search history.

(56) References Cited

U.S. PATENT DOCUMENTS 5,329,453 A * 7/1994 Tsuyama .............. B60T 8/48
                                                              180/197
5,385,394 A * 1/1995 Leppek .............. B60T 8/17616
                                                              303/11

(Continued)

*Primary Examiner* — Frederick Brushaber
(74) *Attorney, Agent, or Firm* — Simpson & Simpson, PLLC

(57) ABSTRACT

A method for adjusting a co-efficient of friction of a disconnect clutch of a hybrid vehicle, the hybrid disconnect clutch separating or connecting an internal combustion engine and an electrical motor, including: delivering, to drive wheels of the hybrid vehicle, a torque output by the internal combustion engine and the electrical motor; determining the co-efficient of friction while the disconnect clutch is in a slipping state; operating the disconnect clutch in first and second operating modes, the first mode including an open state of the disconnect clutch and the second mode including a closed state of the disconnect clutch; and increasing the co-efficient of friction for more rapid adjustment of the slipping state only in the transition from the closed state to the opened state.

9 Claims, 1 Drawing Sheet

(52) U.S. Cl.
CPC .............. *F16D 2500/70426* (2013.01); *F16D 2500/70605* (2013.01); *Y10S 903/946* (2013.01)

(56) References Cited

U.S. PATENT DOCUMENTS

| | | | | |
|---|---|---|---|---|
| 5,428,539 | A * | 6/1995 | Kawamura | B60T 8/175 180/197 |
| 5,583,772 | A * | 12/1996 | Kitano | B60T 8/175 303/158 |
| 7,892,143 | B2 * | 2/2011 | Kato | B60W 10/02 477/107 |
| 8,352,109 | B2 * | 1/2013 | Tsuda | F16H 61/061 701/22 |
| 8,396,636 | B2 * | 3/2013 | Minami | F16D 48/06 192/3.51 |
| 2002/0092722 | A1 * | 7/2002 | Hosoda | F16F 9/364 188/322.17 |
| 2007/0012538 | A1 * | 1/2007 | Katakura | F16H 61/061 192/3.61 |
| 2014/0303822 | A1 * | 10/2014 | Kawamura | B60W 20/00 701/22 |

* cited by examiner

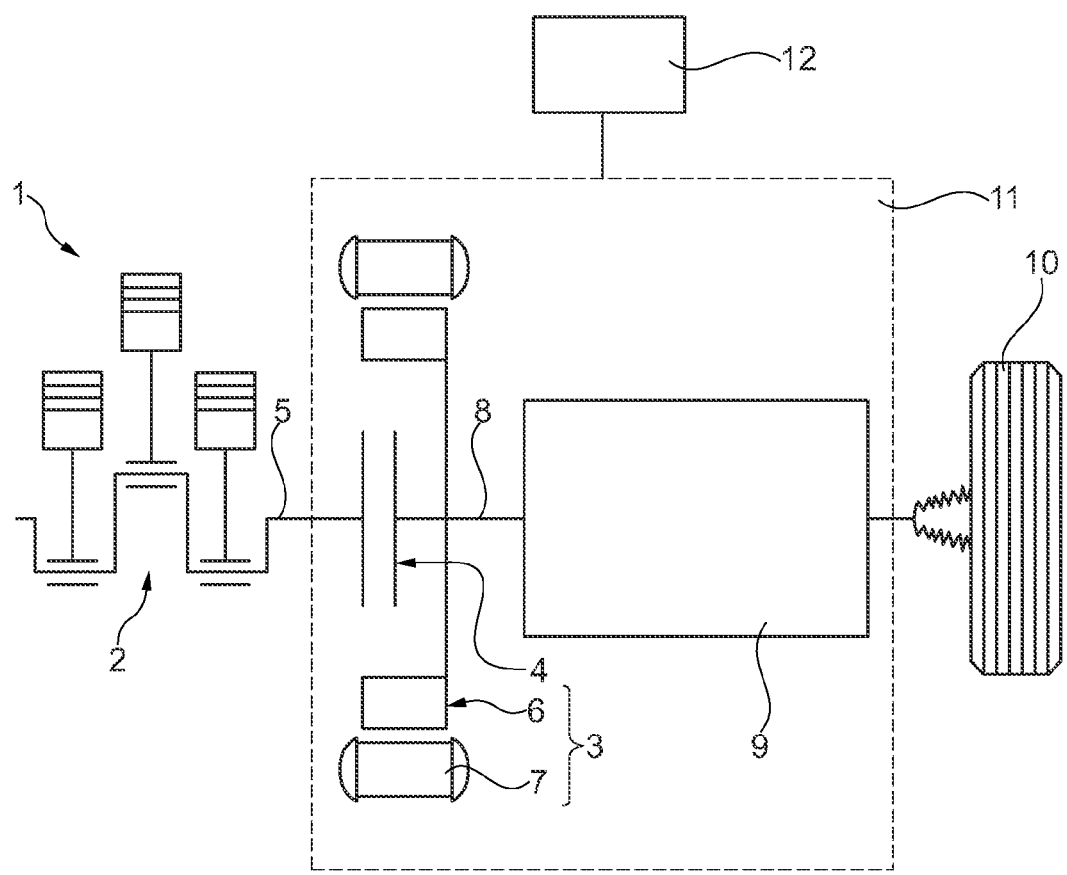

METHOD FOR ADJUSTING A CO-EFFICIENT OF FRICTION OF A DISCONNECT CLUTCH OF A HYBRID VEHICLE

CROSS-REFERENCE TO RELATED APPLICATIONS

This application claims priority to German Patent Application No. 10 2014 218465.7, filed Sep. 15, 2014 and German Patent Application No. 10 2014 224351.3, filed Nov. 28, 2014, which applications are incorporated herein by reference in their entirety.

TECHNICAL FIELD

The present disclosure broadly describes a method for adjusting a co-efficient of friction of a disconnect clutch of a hybrid vehicle, the hybrid disconnect clutch separating or connecting an internal combustion engine and an electrical drive or motor, and a torque output delivered by the internal combustion engine and/or the electric motor being transmitted to drive wheels of the hybrid vehicle, the co-efficient of friction being determined whilst the disconnect clutch is in a slipping state.

BACKGROUND

In automated clutch applications, such as dual clutch or multiple clutch applications, for example, a precise knowledge of the clutch torque is particularly important for the gearshift and driveaway characteristics of the vehicle.

In a hybrid vehicle having a hybrid drivetrain the traction resistance from two independent energy sources, such as the fuel of an internal combustion engine and electrical energy from a traction battery of an electric motor, can be overcome by conversion into mechanical energy. WO 2008/064633 A1 discloses a method and a device for the adaptation of a hybrid disconnect clutch in a vehicle hybrid drive, which is arranged between the internal combustion engine and an electric motor. In the method, the internal combustion engine is shut down and once the internal combustion engine has been switched off, the hybrid disconnect clutch is opened. Then, with the internal combustion switched off and the hybrid disconnect clutch opened, a time gradient of the speed of the internal combustion engine is registered. After partial closing of the hybrid disconnect clutch, as soon as the speed of the internal combustion engine has fallen below a predefined value, the time gradient of the speed of the internal combustion engine is determined with the clutch partially closed. The characteristic curve of the hybrid disconnect clutch is then adapted on the basis of the determined clutch torque transmitted by the partially closed hybrid disconnect clutch. Here the characteristic curve is parameterized by two characteristic variables such as the touch point and the clutch co-efficient of friction. The touch point shifts the clutch characteristic curve as a function of the travel, whilst the co-efficient of friction scales the torque value of the clutch characteristic curve.

In order to be able to adapt the co-efficient of friction reliably, the disconnect clutch must be set to a slipping state with a high clutch torque, a sufficiently frequent good torque quality of the internal combustion engine being necessary. If the hybrid disconnect clutch is used mainly in just two operating modes, closed or opened, however, situations in which slip can occur for adaptation of the co-efficient of friction are rare. Moreover, in situations where the internal combustion engine is started using the hybrid disconnect clutch the internal combustion engine torque is imprecise.

In addition, the overall system has a tendency for oscillations, which leads to an increased detection of apparent slipping states, although the disconnect clutch is fully closed and the internal combustion engine is delivering little torque. Such apparent slipping states lead to a deficient reduction of the co-efficient of friction and therefore drastically reduce the torque accuracy of the system. A slip control allows precise adjustment of the selected slip on the disconnect clutch, but such a slip control is very expensive.

Ramping up the co-efficient of friction until slipping occurs is also known. Such a ramping up of the co-efficient of friction, however, leads again and again to slipping in all driving situations, regardless of which mode the disconnect clutch is in.

BRIEF SUMMARY

The object of the present disclosure is to specify a method for adjusting a co-efficient of friction of a disconnect clutch of a hybrid vehicle which overcomes the disadvantages described.

According to the present disclosure, this object is achieved in that the disconnect clutch is used in two operating modes, the first mode being characterized by an open state of the disconnect clutch and the second mode by a closed state of the disconnect clutch, and the co-efficient of friction being increased for more rapid adjustment of the slipping state only in the transition from the closed state to the opened state. This has the advantage that an adjustment of the co-efficient of friction only ever takes place when the actual operating state of the hybrid vehicle permits. The increase in the co-efficient of friction is therefore coupled to the pattern of use of the disconnect clutch, so that wearing of the disconnect clutch is reduced and the risk of adversely affecting the comfort of the hybrid vehicle is reduced. If the driving pattern rarely gives cause to change the mode of the disconnect clutch, the disconnect clutch is also not made to slip unnecessarily.

For adjusting a slipping state of the disconnect clutch, an over-pressing of the disconnect clutch is advantageously reduced following a relief process (sniffing process) of a hydrostatic clutch actuator. Such over-pressing, which is performed primarily in order to prevent unwanted slipping situations on the disconnect clutch, is regularly reduced following the relief process (sniffing process) in order to promote adjustment of the slip on the disconnect clutch.

In one development a rapid adaptation of the co-efficient of friction is performed in order to shorten the slipping state of the disconnect clutch. This rapid adaptation of the co-efficient of friction means that the slipping state is maintained for only as long as is necessary for adaptation of the co-efficient of friction. If slip also occurs in over-pressing due to model inaccuracies of the disconnect clutch, the rapid adaptation of the co-efficient of friction here too helps to reduce the slip rapidly, since by reducing the co-efficient of friction the disconnect clutch is closed further.

In one variant the co-efficient of friction is increased by a predefined, preferably constant amount at each transition from a first mode of the disconnect clutch, in which the latter is closed, to a second mode of the disconnect clutch, in which the latter is opened. This serves to set a stable co-efficient of friction and therefore a good clutch torque on the disconnect clutch, the co-efficient of friction reflecting the friction characteristics of the disconnect clutch.

In one development an actual co-efficient of friction variation is compared with a threshold value for co-efficient of friction variation and is adjusted in the event of a deviation of the actual co-efficient of friction variation from the threshold value for co-efficient of friction variation. The slip situation is therefore simply adjusted to the prevailing conditions of the hybrid vehicle.

The amount of variation is advantageously increased, should the actual co-efficient of friction variation fall below the threshold value for co-efficient of friction variation. This can easily be accomplished by a control logic which performs the comparison between the threshold value for co-efficient of friction variation and the actual co-efficient of friction variation.

In an alternative, if the actual co-efficient of friction variation exceeds the threshold value for co-efficient of friction variation the amount of variation is reduced and the rapid adaptation of the co-efficient of friction is preferably controlled accordingly. A slip can therefore be forcibly produced very rapidly by a large co-efficient of friction increment, thereby ensuring that the co-efficient of friction is taken as sufficiently high without generating the slip too often.

BRIEF DESCRIPTION OF THE DRAWING

The invention permits numerous embodiments. One of these will be explained in more detail with reference to the FIGURE represented in the drawing, of which FIG. 1: shows a basic diagram of a hybrid drive.

The same features are identified by the same reference numerals.

DETAILED DESCRIPTION

FIG. 1 shows a basic diagram of a drivetrain of a hybrid vehicle. Drivetrain 1 comprises internal combustion engine 2 and electric motor 3. Hybrid disconnect clutch 4 is arranged between internal combustion engine 2 and electric motor 3, directly behind internal combustion engine 2. Internal combustion engine 2 and hybrid disconnect clutch 4 are connected to one another by crankshaft 5. Electric motor 3 includes rotatable rotor 6 and fixed stator 7. Output shaft 8 of hybrid disconnect clutch 4 is connected to transmission 9, which contains a coupling element (not represented further), for example a second clutch or a torque converter, which are arranged between electric motor 3 and transmission 9. Transmission 9 transmits the torque generated by internal combustion engine 2 and/or electric motor 3 to drive wheels 10 of the hybrid vehicle. Hybrid disconnect clutch 4 and transmission 9 here form transmission system 11, which is activated by hydrostatic clutch actuator 12. Disconnect clutch 4 arranged between internal combustion engine 2 and electric motor 3 is closed in order to start internal combustion engine 2 with the torque generated by electric motor 3 whilst the hybrid vehicle is being driven or to run with internal combustion engine 2 and electric motor 3 driving the vehicle during a boost mode. Here, disconnect clutch 4 is actuated by hydrostatic clutch actuator 12. In order to ensure that an adequate torque is delivered by electric motor 3 when restarting internal combustion engine 2 by means of electric motor 3, and the torque to both move the hybrid vehicle via drive wheels 10 without any loss of comfort and at the same time also start internal combustion engine 2, it is necessary to have precise knowledge of a clutch torque characteristic curve of disconnect clutch 4, showing a clutch torque over the actuator travel.

For determining the co-efficient of friction of disconnect clutch 4, which scales the torque value of this nominal clutch characteristic curve, a check is performed as to the present operating state of disconnect clutch 4. Disconnect clutch 4 has only two modes—closed and opened—between which it constantly switches. Only when disconnect clutch 4 switches to the opened state after previously being in the closed state is the co-efficient of friction increased by a fixed, predefined co-efficient of friction increment, which leads to a slipping state of disconnect clutch 4 in which the actual adaptation of the co-efficient of friction is performed.

In order to assist the adjustment of the slipping state it is determined beforehand whether there is any over-pressing of disconnect clutch 4. If this is the case, the over-pressing of disconnect clutch 4 is reduced following a relief process (sniffing process) of hydrostatic clutch actuator 12, in which clutch actuator 12 is connected to a hydraulic reservoir for pressure and temperature equalization of the hydraulic fluid circulating in clutch actuator 12. It is assumed, immediately following such a relief process (sniffing process), that conditions have stabilized in clutch actuator 12 and therefore also on disconnect clutch 4, so that an adaptation of the co-efficient of friction is possible at any time.

If slip also occurs in the event of over-pressing of disconnect clutch 4, this can be reduced through a rapid adaptation of the co-efficient of friction, since by reducing the co-efficient of friction disconnect clutch 4 is closed further. A favorable selection of the co-efficient of friction increment, always to be increased by a fixed amount in each cycle, and a regular reduction of the over-pressing on disconnect clutch 4 permits a stable co-efficient of friction which reflects the friction characteristics of the clutch hardware.

Too high a co-efficient and hence slip on disconnect clutch 4 can be rapidly adjusted at any time through a rapid adaptation of the co-efficient of friction, but too low a co-efficient of friction cannot be adjusted through use of the constant co-efficient of friction increment. In this case, in an alternative it is determined by a logic circuit whether or not the co-efficient of friction is much too low by comparing an actual co-efficient of friction variation with a threshold value for the co-efficient of friction variation. If the actual co-efficient of friction variation is less than the threshold value for co-efficient of friction variation, the co-efficient of friction increment is adjusted, and advantageously increased, by the logic circuit. The slip can therefore be forcibly produced rapidly by a large co-efficient of friction increment. For this purpose, however, a rapid adaptation of the co-efficient of friction must also be controlled accordingly.

Should the actual co-efficient of friction variation exceed the threshold value for co-efficient of friction variation, the co-efficient of friction increment is reduced to a smaller value. This ensures that the co-efficient of friction is high enough without generating the slip too often.

The proposed solution allows an event-controlled adaptation of the co-efficient of friction in contrast to the time-controlled adaptation of the co-efficient of friction known in the prior art. A balance can therefore be struck between adaptation frequency and expected variation. Possible negative effects with regard to wear of the lining of disconnect clutch 4 and the effect on ride comfort are therefore largely avoided.

LIST OF REFERENCE NUMERALS 1 drivetrain
2 internal combustion engine 3 electric motor
4 disconnect clutch
5 crankshaft
6 rotor
7 stator
8 output shaft
9 transmission
10 drive wheels
11 transmission system
12 clutch actuator

What is claimed is:

1. A method for adjusting a co-efficient of friction of a disconnect clutch of a hybrid vehicle, the hybrid disconnect clutch separating or connecting an internal combustion engine and an electrical motor, comprising:
    delivering, to drive wheels of the hybrid vehicle, a torque output by the internal combustion engine and the electrical motor;
    determining the co-efficient of friction while the disconnect clutch is in a middle slipping state;
    operating the disconnect clutch in first and second operating modes, the first mode including a fully opened state of the disconnect clutch and the second mode including a fully closed state of the disconnect clutch; and,
    increasing the co-efficient of friction for rapid adjustment of the middle slipping state only in a transition from the fully closed state to the fully opened state.

2. The method according to claim 1, further comprising:
    reducing an over-pressing of the disconnect clutch via a relief process of a hydrostatic clutch actuator; and,
    adjusting the middle slipping state of the disconnect clutch.

3. The method according to claim 1, further comprising:
    performing a rapid adaptation of the co-efficient of friction in order to shorten the middle slipping state of the disconnect clutch.

4. The method according to claim 1, further comprising:
    increasing the co-efficient of friction by a predefined amount at the transition from the fully closed state to the fully opened state.

5. The method according to claim 1, further comprising:
    comparing an actual co-efficient of friction variation with a threshold value for co-efficient of friction variation; and,
    adjusting the actual co-efficient of friction for a deviation of the actual co-efficient of friction variation from the threshold value for co-efficient of friction variation.

6. The method according to claim 5, further comprising:
    increasing the actual co-efficient of friction variation when it falls below the threshold value for co-efficient of friction variation.

7. The method according to claim 5, further comprising:
    when the actual co-efficient of friction variation exceeds the threshold value for co-efficient of friction variation:
        reducing an amount of variation; and,
        adjusting the rapid adaptation of the co-efficient of friction accordingly.

8. The method according to claim 1, further comprising:
    increasing the co-efficient of friction by a predefined constant amount at the transition from the fully closed state to the fully opened state.

9. A method for adjusting a co-efficient of friction of a disconnect clutch of a hybrid vehicle, the hybrid disconnect clutch separating or connecting an internal combustion engine and an electrical motor, comprising:
    delivering, to drive wheels of the hybrid vehicle:
        a torque output by the internal combustion engine; or,
        a torque output by the electrical motor;
    determining the co-efficient of friction while the disconnect clutch is in a middle slipping state;
    operating the disconnect clutch in first and second operating modes, the first mode including a fully opened state of the disconnect clutch and the second mode including a fully closed state of the disconnect clutch; and,
    increasing the co-efficient of friction for rapid adjustment of the slipping state only in a transition from the fully closed state to the fully opened state.

* * * * *